(12) United States Patent
Liu et al.

(10) Patent No.: US 12,398,441 B2
(45) Date of Patent: Aug. 26, 2025

(54) METHOD FOR ENRICHING NIOBIUM AND TITANIUM IN A MINERAL CONTAINING IRON, NIOBIUM AND TITANIUM AND A USE OF A NICKEL-CONTAINING SUBSTANCE

(71) Applicants: BAOTOU RESEARCH INSTITUTE OF RARE EARTHS, Baotou (CN); NATIONAL ENGINEERING RESEARCH CENTRE OF RUIKE RARE EARTH METALLURGY AND FUNCTION MATERIALS CO., LTD., Baotou (CN)

(72) Inventors: Yubao Liu, Baotou (CN); Erxiong Zhao, Baotou (CN); Xianheng Zhang, Baotou (CN); Pengfei Yang, Baotou (CN); Yuan Li, Baotou (CN); Guohua Chen, Baotou (CN); Weidong Lv, Baotou (CN); Rizeng Gao, Baotou (CN); Xuchen Miao, Baotou (CN); Bing Yu, Baotou (CN); Fusheng Hou, Baotou (CN); Quanjun Zhang, Baotou (CN); Haitao Huang, Baotou (CN); Qicao Yan, Baotou (CN); Yang Zhang, Baotou (CN); Jia Kang, Baotou (CN); Yueyang Dong, Baotou (CN); Ran Liu, Baotou (CN); Yiren Hao, Baotou (CN)

(73) Assignees: BAOTOU RESEARCH INSTITUTE OF RARE EARTHS, Baotou (CN); NATIONAL ENGINEERING RESEARCH CENTRE OF RUIKE RARE EARTH METALLURGY AND FUNCTION MATERIALS CO, LTD., Baotou (CN)

( * ) Notice: Subject to any disclaimer, the term of this patent is extended or adjusted under 35 U.S.C. 154(b) by 183 days.

(21) Appl. No.: 18/249,336

(22) PCT Filed: May 5, 2022

(86) PCT No.: PCT/CN2022/090887
§ 371 (c)(1),
(2) Date: Apr. 17, 2023

(87) PCT Pub. No.: WO2022/237607
PCT Pub. Date: Nov. 17, 2022

(65) Prior Publication Data
US 2023/0416870 A1 Dec. 28, 2023

(30) Foreign Application Priority Data
May 8, 2021 (CN) .......................... 202110498918.3

(51) Int. Cl.
*C22B 9/14* (2006.01)
*C22B 34/12* (2006.01)
(Continued)

(52) U.S. Cl.
CPC ............ *C22B 9/14* (2013.01); *C22B 34/1209* (2013.01); *C22B 34/24* (2013.01); *C22C 1/00* (2013.01); *C22C 19/03* (2013.01)

(58) Field of Classification Search
CPC ....... C22B 9/14; C22B 34/1209; C22B 34/24; C22B 7/04; C22B 5/10; C22B 1/02; C22C 1/00; C22C 19/03; C21B 13/006
(Continued)

(56) References Cited

U.S. PATENT DOCUMENTS

2010/0031777 A1  2/2010  Akiyama et al.

FOREIGN PATENT DOCUMENTS

CN  102212637 A     10/2011
CN  103993162 A  *  8/2014  ............... C22B 1/11
(Continued)

OTHER PUBLICATIONS

International Search Report issued in International Application No. PCT /CN2022/090887 dated Aug. 2, 2022 (3 pages).
(Continued)

*Primary Examiner* — Danielle M. Carda
(74) *Attorney, Agent, or Firm* — OSHA BERGMAN WATANABE & BURTON LLP

(57) ABSTRACT

A method for enriching niobium and titanium in a mineral containing iron, niobium, and titanium, includes: reacting
(Continued)

raw materials comprising 1 part by weight of a mineral containing iron, niobium, and titanium, 0.1-0.8 part by weight of a nickel-containing substance and 0.2-1 part by weight of carbon at 800-1500° C. to obtain a nickel-iron alloy and a niobium-titanium rich slag, where an amount of the mineral containing iron, niobium, and titanium is counted in terms of iron element, and an amount of the nickel-containing substance is counted in terms of nickel element. The nickel-containing substance is one or more selected from the group consisting of oxides of nickel and nickel minerals.

10 Claims, 1 Drawing Sheet

(51) Int. Cl.
*C22B 34/24* (2006.01)
*C22C 1/00* (2023.01)
*C22C 19/03* (2006.01)

(58) Field of Classification Search
USPC .................................................. 75/612
See application file for complete search history.

(56) References Cited

FOREIGN PATENT DOCUMENTS

| CN | 104498737 A | | 4/2015 | |
|----|-------------|---|--------|---|
| CN | 105154659 A | | 12/2015 | |
| CN | 106755989 A | | 5/2017 | |
| CN | 106987673 A | | 7/2017 | |
| CN | 112281002 A | * | 1/2021 | .......... C22B 34/1209 |
| CN | 112410586 A | * | 2/2021 | ............. C22B 34/24 |
| CN | 113215389 A | | 8/2021 | |

OTHER PUBLICATIONS

Written Opinion issued in International Application No. PCT/CN2022/090887 dated Aug. 2, 2022 (4 pages).

* cited by examiner

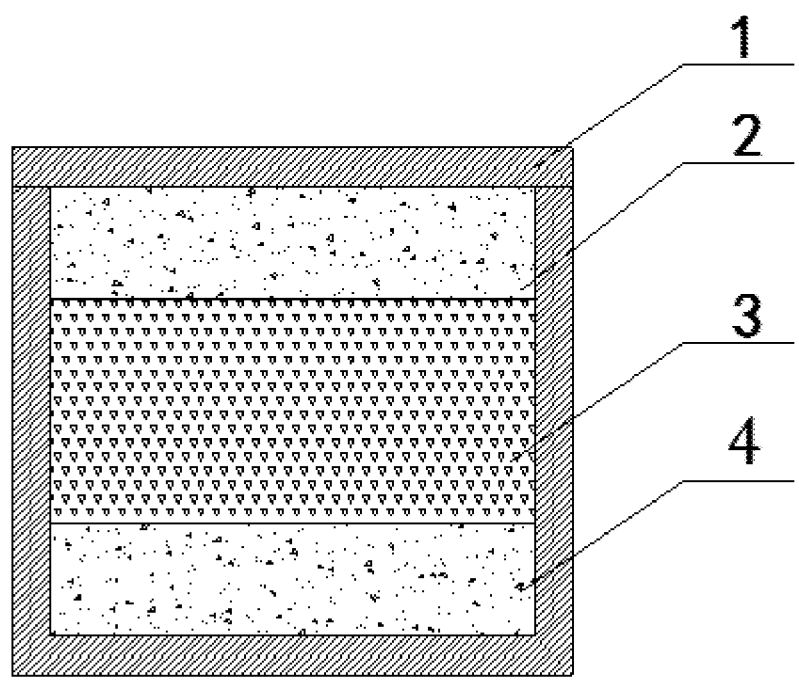

METHOD FOR ENRICHING NIOBIUM AND TITANIUM IN A MINERAL CONTAINING IRON, NIOBIUM AND TITANIUM AND A USE OF A NICKEL-CONTAINING SUBSTANCE

TECHNICAL FIELD OF THE DISCLOSURE

The present disclosure relates to a method for enriching niobium and titanium in a mineral containing iron, niobium and titanium and a use of a nickel-containing substance.

BACKGROUND OF THE DISCLOSURE

Niobium is an important strategic resource in China. Although China has rich niobium resources, ranking the second place in the world, just after Brazil, China has not realized comprehensive utilization of the valuable element, because these niobium resources have low grade and fine dissemination size. At present, all niobium used in China is almost imported. The niobium resources in China are mainly distributed in Baiyenebo of Baotou, Taimei and Limu of Guangxi, Yichun of Jiangxi and Keketuohai of Xinjiang. Among these places, Baiyenebo has the largest niobium resource reserves, accounting for 95% of China's niobium resource reserves. Its prospective reserves reach 6.6 million tons, and its industrial reserves are 1.57 million tons.

Generally, a mineral containing niobium and titanium has about 35-60 wt % iron-containing oxide, about 0.5-4 wt % niobium oxide, about 0.5-4 wt % titanium dioxide, and about 0.1-1.5 wt % phosphorus oxide. The mineral containing niobium and titanium has a low niobium grade and high phosphorus content, so it is expensive to be directly smelt into niobium-titanium-iron alloy, while phosphorus and other impurities may easily enter into the alloy, resulting in the alloy with low quality.

CN103993162A discloses a method for removing iron and phosphorus from niobium-iron concentrate with a high content of phosphorus, comprising the following steps: adding niobium-iron concentrate and semi-coke in a silicon carbide reaction tank; placing the reaction tank in a high temperature furnace and keeping it at a temperature of 850-1050° C. for 40-60 hours, so as to transfer the niobium-iron concentrate into iron-containing concentrate lumps through the solid state reduction; cooling down to 200-300° C. in the furnace; taking out and cleaning the reduced product to obtain the reduced bulk concentrate; mixing the bulk concentrate and lime, and then adding the mixture into an electric furnace; controlling alkalinity of the mixture to 0.5±0.1 and keeping the mixture at a melting separation temperature of 1370-1500° C. for 2-30 min, and then casting and cooling to obtain phosphorus-containing pig iron and a niobium slag with a low content of phosphorus and iron. This method requires two main processes, namely selective reduction and melting separation to enrich niobium, so the process is complicated.

CN102212637A discloses a direct reduction and direct alloying method for recovering niobium from iron mineral powder with a low grade of niobium, comprising the following steps: obtaining sponge iron from iron mineral powder with a low grade of niobium in a high temperature furnace through gas-based or coal-based direct reduction; adding the sponge iron into an electric furnace and smelting to realize melting separation of slag and metals while a relatively inert metal forms Fe—P alloy and niobium is enriched in the slag in the form of oxides; adding the niobium-rich slag onto a molten steel surface, and reducing niobium oxide in the slag with a reducing agent, so that niobium enters the molten steel. This method requires two steps, namely reduction and smelting, to separate iron, phosphorus and nickel slag.

SUMMARY OF THE DISCLOSURE

An objective of the present disclosure is to provide a method for enriching niobium and titanium in a mineral containing iron, niobium and titanium. The method may separate iron, phosphorus and other elements in a mineral containing iron, niobium and titanium from niobium and titanium in one step. Further, the method may improve the yield of niobium and titanium, and has an excellent enrichment effect of niobium and titanium. Furthermore, the method may improve removal rates of iron and phosphorus. Another object of the present disclosure is to provide a use of a nickel-containing substance.

The above technical objectives are achieved through the following technical solutions.

On one hand, the present disclosure provides a method for enriching niobium and titanium in a mineral containing iron, niobium and titanium, comprising the following steps:

reacting raw materials comprising 1 part by weight of a mineral containing iron, niobium and titanium, 0.1-0.8 part by weight of a nickel-containing substance and 0.2-1 part by weight of carbon at 800-1500° C. to obtain a nickel-iron alloy and a niobium-titanium rich slag, respectively;

wherein, the nickel-containing substance is one or more selected from the group consisting of oxides of nickel and nickel minerals; the amount of the mineral containing iron, niobium and titanium is counted in terms of iron element, and the amount of the nickel-containing substance is counted in terms of nickel element.

According to the method of the present disclosure, preferably, the reaction is performed for 20-50 h.

According to the method of the present disclosure, preferably, the raw materials consist of 1 part by weight of the mineral containing iron, niobium and titanium, 0.2-0.6 part by weight of the nickel-containing substance and 0.4-0.7 part by weight of the carbon;

wherein the amount of the mineral containing iron, niobium and titanium is counted in terms of iron element, and the amount of the nickel-containing substance is counted in terms of nickel element.

According to the method of the present disclosure, preferably, the mineral containing iron, niobium and titanium comprises 5-70 wt % of $Fe_2O_3$, 0.8-4 wt % of FeO, 0.1-1.5 wt % of $P_2O_5$, 0.5-20 wt % of $Nb_2O_5$ and 0.5-20 wt % of $TiO_2$.

According to the method of the present disclosure, preferably, the carbon is semi-coke.

According to the method of the present disclosure, preferably, the carbon comprises 6-15 wt % of ash, 10-22 wt % of volatile matter and 60-85 wt % of fixed carbon; and the carbon has a particle size of less than or equal to 20 mm.

According to the method of the present disclosure, preferably, the oxides of nickel are nickel oxide.

According to the method of the present disclosure, preferably, the reaction is carried out in a reaction device, the reaction device contains the raw materials, the raw materials in the reaction device are divided into raw materials in upper layer, raw materials in middle layer and raw materials in lower layer; the raw materials in the upper layer and the lower layer are carbon, and the raw materials in the middle layer are a mixture of the mineral containing iron, niobium and titanium and the nickel-containing substance.

According to the method of the present disclosure, preferably, niobium has a yield of more than 99 wt %, titanium has a yield of more than or equal to 99 wt %, an enrichment ratio of niobium is more than 1.5 times, and an enrichment ratio of titanium is more than 1.5 times.

On the other hand, the present disclosure provides a use of a nickel-containing substance to enrich niobium and titanium from the mineral containing iron, niobium and titanium, wherein the nickel-containing substance is one or more selected from the group consisting of oxides of nickel or nickel minerals.

By controlling reaction temperature and amount of nickel-containing substance, the present disclosure promotes formation of nickel-iron alloy between nickel and iron in the mineral containing iron, niobium and titanium, and thus the nickel-iron alloy and a niobium-titanium rich slag can be obtained in one step. Therefore, iron, phosphorus and other elements in the mineral containing iron, niobium and titanium are separated from niobium and titanium. The preferred technical solution of the present disclosure can have a higher iron removal rate and a better enrichment effect of niobium and titanium due to controlling the amount of each raw material and the reduction temperature.

DESCRIPTION OF ATTACHED DRAWINGS

FIG. 1 shows a filling way of raw materials of the present disclosure.

Numbers in the attached drawings indicate as follows:
1—reaction device; 2—raw materials in the upper layer; 3—raw materials in the middle layer; 4—raw materials in the lower layer.

DETAIL DESCRIPTION OF THE DISCLOSURE

Selective reduction of a mineral containing iron, niobium and titanium, a nickel-containing substance and carbon was performed at a certain temperature to reduce oxides of iron and phosphorus etc., while niobium, titanium and other elements are still in a form of oxides. In addition, at this temperature, iron and nickel may form an alloy in an appropriate proportion, so that iron and a niobium-titanium rich slag may be separated in one step. In the prior art, it is usually necessary to separate iron from niobium and titanium in multiple steps. Through ingenious design, the present disclosure may separate iron from a niobium-titanium rich slag in one step. The following is a detailed description.

<Method for Enriching Niobium and Titanium in the Mineral Containing Iron, Niobium and Titanium>

The method of the present disclosure comprises the following steps: reacting raw materials comprising a mineral containing iron, niobium and titanium, a nickel-containing substance and carbon to obtain a nickel-iron alloy and a niobium-titanium rich slag, respectively. In some embodiments, the raw materials consist of the mineral containing iron, niobium and titanium, the nickel-containing substance and the carbon.

The mineral containing iron, niobium and titanium of the present disclosure may contain $Fe_2O_3$. The content of $Fe_2O_3$ may be 5-70 wt %, preferably 40-65 wt %, more preferably 50-60 wt %. The mineral containing iron, niobium and titanium may contain FeO. The content of FeO may be 0.8-4 wt %, preferably 1-2 wt %, more preferably 1-1.3 wt %. The mineral containing iron, niobium and titanium may contain $SiO_2$. The content of $SiO_2$ may be 12-25 wt %, preferably 14-18 wt %, more preferably 15-17 wt %. The mineral containing iron, niobium and titanium may contain $Nb_2O_5$. The content of $Nb_2O_5$ may be 0.5-20 wt %, preferably 2-4.5 wt %, more preferably 3-4 wt %. The mineral containing iron, niobium and titanium may contain $TiO_2$. The content of $TiO_2$ may be 0.5-20 wt %, preferably 3-5 wt %, more preferably 3.8-4.5 wt %. The mineral containing iron, niobium and titanium may contain $P_2O_5$. The content of $P_2O_5$ may be 0.1-1.5 wt %, preferably 0.5-1.2 wt %, more preferably 0.7-1 wt %.

The nickel-containing substance of the present disclosure may be one or more selected from the group consisting of oxides of nickel or nickel minerals. Examples of oxides of nickel comprise, but are not limited to, nickel oxide or nickel trioxide. Examples of nickel mineral comprise, but are not limited to, pentlandite, garnierite, millerite, pyrite or nickeline. According to one embodiment of the present disclosure, the nickel-containing substance is nickel oxide.

The carbon of the present disclosure may be semi-coke. As a new type of carbon, semi-coke may be obtained by burning high-quality Jurassic refined coal blocks which are rich in Shenfu Coal Field. In the present disclosure, the ash content of the carbon may be 6-15 wt %, preferably 8-13 wt %, more preferably 10-12 wt %. The content of volatile matter of the carbon may be 10-22 wt %, preferably 12-20 wt %, more preferably 14-17 wt %. The content of fixed carbon of the carbon may be 60-85 wt %, preferably 65-80 wt %, more preferably 70-75 wt %. The particle size of carbon may be expressed as d, d≤20 mm, preferably d≤10 mm, more preferably 0.3 mm≤d≤3 mm. It will be helpful to increase the removal rates of iron and phosphorus, and to improve the enrichment effects of niobium and titanium.

In the present disclosure, raw materials comprising the mineral containing iron, niobium and titanium, the nickel-containing substance and the carbon is reacted at 800-1500° C. Preferably, the reaction is performed at 900-1100° C. More preferably, the reaction performed at 960-1050° C. According to one embodiment of the present disclosure, the reaction performed at 1000-1050° C. Such a temperature range is conducive to a selective reduction of iron, phosphorus and other elements, and is conducive to formation of an alloy of iron and nickel, so as to separate an iron element from the mineral containing iron, niobium and titanium in one step and enrich niobium and titanium. Such a temperature range also helps to increase the removal rates of iron, phosphorus and other elements, increase collection rates of niobium and titanium, and improve enrichment effects of niobium and titanium.

In the present disclosure, the reaction may be performed for 20-50 h, preferably 25-40 h, more preferably 25-30 h. In such way, iron, phosphorus and other elements may be fully reduced, and iron and nickel may form an alloy, which may also shorten the reaction time and save energy.

According to an embodiment of the present disclosure, the reaction of raw materials comprising the mineral containing iron, niobium and titanium, the nickel-containing substance and the carbon is performed in a reaction device. The reaction device may be a sealed device. The reaction device may be a reaction tank. The raw materials filled in the reaction device may be divided into raw materials in upper layer, raw materials in middle layer and raw materials in lower layer; wherein the raw materials in the upper and lower layers are carbon, and the raw materials in the middle layer are a mixture of the mineral containing iron, niobium and titanium and the nickel-containing substance. It will promote the reaction, improve the removal rates of iron, phosphorus and other elements, and help formation of a nickel-iron alloy.

Based on 1 part by weight of the mineral containing iron, niobium and titanium, the amount of the nickel-containing substance is 0.1-0.8 parts by weight, preferably 0.2-0.6 parts by weight, more preferably 0.4-0.6 parts by weight; wherein the amount of the mineral containing iron, niobium and titanium is calculated by the iron element in the mineral containing iron, niobium and titanium, and the amount of nickel-containing substance is calculated by the nickel element. If the amount of the nickel-containing substance is too low, it is not conducive to formation of nickel-iron alloy, and iron cannot be separated from a niobium-titanium rich slag. If the amount of the nickel-containing substance is excessive, it is not conducive to formation of a nickel-iron alloy, and impurities may be introduced.

Based on 1 part by weight of the mineral containing iron, niobium and titanium, the amount of the carbon is 0.2-1 part by weight, preferably 0.4-0.7 parts by weight, more preferably 0.5-0.7 parts by weight; wherein the amount of the mineral containing iron, niobium and titanium is calculated by the iron element in the mineral containing iron, niobium and titanium. It will help to increase the removal rates of iron, phosphorus and other elements, and improve enrichment effects of niobium and titanium and other elements.

According to an embodiment of the present disclosure, the raw material comprises 1 part by weight of the mineral containing iron, niobium and titanium, 0.1-0.8 parts by weight of the nickel-containing substance, and 0.2-1 parts by weight of the carbon. According to another embodiment of the present disclosure, the raw material comprises 1 part by weight of the mineral containing iron, niobium and titanium, 0.2-0.6 parts by weight of the nickel-containing substance, and 0.4-0.7 parts by weight of the carbon. According to a further embodiment of the present disclosure, the raw material comprises 1 part by weight of the mineral containing iron, niobium and titanium, 0.4-0.6 parts by weight of the nickel-containing substance, and 0.5-0.7 parts by weight of the carbon. According to another further embodiment of the present disclosure, the raw material comprises 1 part by weight of the mineral containing iron, niobium and titanium, 0.5-0.7 parts by weight of the nickel-containing substance, and 0.6-0.8 parts by weight of the carbon.

In the method of the present disclosure, the removal rate of iron is more than 95 wt %; preferably, the removal rate of iron is more than or equal to 96 wt %; more preferably, the removal rate of iron is more than or equal to 97 wt %. In the method of the present disclosure, the removal rate of phosphorus is more than 93 wt %; preferably, the removal rate of phosphorus is more than 95 wt %. In the method of the present disclosure, the yield of niobium is more than 99 wt %; preferably, the yield of niobium is more than or equal to 99.5 wt %. In the method of the present disclosure, the titanium yield is more than 99 wt %; preferably, the titanium yield is more than or equal to 99.5 wt %. In the method of the present disclosure, an enrichment ratio of niobium is more than or equal to 1.5 times; preferably, the enrichment ratio of niobium is more than or equal to 1.8 times; more preferably, the enrichment ratio of niobium is more than or equal to 2.3 times. In the method of the present disclosure, an enrichment ratio of titanium is more than or equal to 1.5 times; preferably, the enrichment ratio of titanium is more than or equal to 1.8 times; more preferably, the enrichment ratio of titanium is more than or equal to 2.3 times.

<Use of a Nickel-Containing Substance>

The present disclosure provides a use of a nickel-containing substance for enriching niobium and titanium from the mineral containing iron, niobium and titanium. The nickel-containing substance of the present disclosure is one or more selected from the group consisting of oxides of nickel or nickel minerals. Examples of oxides of nickel comprise, but are not limited to, nickel oxide or nickel trioxide. Examples of nickel mineral comprise, but are not limited to, pentlandite, garnierite, millerite, pyrite or nickeline. According to an embodiment of the present disclosure, the nickel-containing substance is nickel oxide. Specifically, the raw materials comprising the mineral containing iron, niobium and titanium, the nickel-containing substance and the carbon are reacted to obtain a nickel-iron alloy and a niobium-titanium rich slag, respectively. The raw material may consist of the mineral containing iron, niobium and titanium, the nickel-containing substance and the carbon. Based on 1 part by weight of the mineral containing iron, niobium and titanium, the amount of the nickel-containing substance is 0.1-0.8 parts by weight; preferably 0.2-0.6 parts by weight; more preferably 0.4-0.6 parts by weight. The amount of the mineral containing iron, niobium and titanium is calculated by the iron element in the mineral containing iron, niobium and titanium. The amount of the nickel-containing substance is calculated by the nickel element. Too low amount of the nickel-containing substance is unfavorable for formation of a nickel-iron alloy, and iron cannot be separated from a niobium-titanium rich slag; while an excessive amount of nickel-containing substance is unfavorable for formation of a nickel-iron alloy, either, and impurities will be introduced. Based on 1 part by weight of the mineral containing iron, niobium and titanium, the amount of the carbon is 0.2-1 part by weight, preferably 0.4-0.7 parts by weight, more preferably 0.5-0.7 parts by weight. The amount of the mineral containing iron, niobium and titanium is calculated by the iron element in the mineral containing iron, niobium and titanium. It will help to increase the removal rates of iron, phosphorus and other elements, and improve enrichment effects of niobium, titanium and other elements.

According to an embodiment of the present disclosure, the raw material comprises 1 part by weight of the mineral containing iron, niobium and titanium, 0.1-0.8 parts by weight of the nickel-containing substance and 0.2-1 parts by weight of the carbon. According to another embodiment of the present disclosure, the raw material comprises 1 part by weight of the mineral containing iron, niobium and titanium, 0.2-0.6 parts by weight of the nickel-containing substance and 0.4-0.7 parts by weight of the carbon. According to a further embodiment of the present disclosure, the raw material comprises 1 part by weight of the mineral containing iron, niobium and titanium, 0.4-0.6 parts by weight of the nickel-containing substance and 0.5-0.7 parts by weight of the carbon. According to another further embodiment of the present disclosure, the raw material comprises 1 part by weight of the mineral containing iron, niobium and titanium, 0.5-0.7 parts by weight of the nickel-containing substance and 0.6-0.8 parts by weight of the carbon.

The mineral containing iron, niobium and titanium of the present disclosure may comprise $Fe_2O_3$. The content of $Fe_2O_3$ may be 5-70 wt %, preferably 40-65 wt %, more preferably 50-60 wt %. The mineral containing iron, niobium and titanium may comprise FeO. The content of FeO may be 0.8-4 wt %, preferably 1-2 wt %, more preferably 1-1.3 wt %. The mineral containing iron, niobium and titanium may comprise $SiO_2$. The content of $SiO_2$ may be 12-25 wt %, preferably 14-18 wt %, more preferably 15-17 wt %. The mineral containing iron, niobium and titanium may comprise $Nb_2O_5$. The content of $Nb_2O_5$ may be 0.5-20 wt %, preferably 2-4.5 wt %, more preferably 3-4 wt %. The mineral containing iron, niobium and titanium may comprise $TiO_2$. The content of $TiO_2$ may be 0.5-20 wt %, preferably 3-5 wt %, more preferably 3.8-4.5 wt %. The mineral containing iron, niobium and titanium may comprise $P_2O_5$. The content of $P_2O_5$ may be 0.1-1.5 wt %, preferably 0.5-1.2 wt %, more preferably 0.7-1 wt %.

The carbon of the present disclosure may be semi-coke. As a new type of carbon, semi-coke may be obtained by burning high-quality Jurassic refined coal blocks which are rich in Shenfu Coal Field. In the present disclosure, the ash content of the carbon may be 6-15 wt %, preferably 8-13 wt %, more preferably 10-12 wt %. The content of volatile matter of the carbon may be 10-22 wt %, preferably 12-20 wt %, more preferably 14-17 wt %. The content of fixed carbon of the carbon may be 60-85 wt %, preferably 65-80 wt %, more preferably 70-75 wt %. The particle size of carbon may be expressed as d, d≤20 mm, preferably d≤10 mm, more preferably 0.3 mm≤d≤3 mm. It will help to increase the removal rates of iron and phosphorus, and to improve enrichment effects of niobium and titanium.

In the present disclosure, the reaction of raw materials comprising the mineral containing iron, niobium and titanium, the nickel-containing substance and the carbon is performed at 800-1500° C., preferably 900-1100° C., more preferably 960-1050° C., for 20-50 h, preferably 25-40 h, more preferably 25-30 h. According to an embodiment of the present disclosure, the reaction is performed at 1000-1050° C. Such a temperature range is conducive to the selective reductions of iron, phosphorus and other elements, and is conducive to formation of an alloy of iron and nickel, so as to separate an iron element from the mineral containing iron, niobium and titanium in one step and enrich niobium and titanium. Such a temperature range also helps to increase the removal rates of iron, phosphorus and other elements, increase collection rates of niobium and titanium, and improve enrichment effects of niobium and titanium. The above reaction time is suitable. It can not only fully reduce iron, phosphorus and other elements, and form an alloy of iron and nickel, but also shorten the reaction time and save energy.

According to an embodiment of the present disclosure, the reaction of raw materials consisting of the mineral containing iron, niobium and titanium, the nickel-containing substance and the carbon is performed in a reaction device. The reaction device may be a sealed device. The reaction device may be a reaction tank. The raw materials filled in the reaction device may be divided into raw materials in upper layer, raw materials in middle layer and raw materials in lower layer; wherein the raw materials in the upper and lower layers are carbon, and the raw materials in the middle layer are a mixture of the mineral containing iron, niobium and titanium and nickel-containing substance. It will promote the reaction, improve the removal rates of iron, phosphorus and other elements, and help formation of a nickel-iron alloy.

The removal rate of iron in the present disclosure is more than 95 wt %, preferably, more than or equal to 96 wt %, more preferably, more than or equal to 97 wt %. The removal rate of phosphorus in the present disclosure is more than 93 wt %; preferably, more than 95 wt %. The yield of niobium in the present disclosure is more than 99 wt %; preferably, more than or equal to 99.5 wt %. The titanium yield in the present disclosure is more than 99 wt %, preferably, more than or equal to 99.5 wt %. An enrichment ratio of niobium in the present disclosure is more than or equal to 1.5 times; preferably, more than or equal to 1.8 times; more preferably, more than or equal to 2.3 times. An enrichment ratio of titanium in the present disclosure is more than or equal to 1.5 times; preferably, more than or equal to 1.8 times; more preferably, more than or equal to 2.3 times.

The tests and calculation method of the present disclosure are described as following:

Removal rate of phosphorus ($\eta_p$): it is calculated by the following formula:

$$\eta_P = \frac{A \times P\%_{iron}}{B \times P\%_{mineral} + C \times P\%_{Ni}} \times 100\%$$

where $P\%_{iron}$—content of phosphorus in a nickel-iron alloy, %;
A—weight of a nickel-iron alloy, g;
$P\%_{mineral}$—content of phosphorus in a mineral containing iron, niobium and titanium, %;
B—weight of a mineral containing iron, niobium and titanium (raw material), g;
$P\%_{Ni}$—content of phosphorus in a nickel-containing substance (raw material), %;
C—weight of a nickel-containing substance (raw material), g.

Removal rate of iron ($\eta_{Fe}$): it is calculated by the following formula:

$$\eta_{Fe} = \frac{A \times Fe\%_{iron}}{B \times Fe\%_{mineral} + C \times Fe\%_{Ni}} \times 100\%$$

where $Fe\%_{iron}$—content of iron in a nickel-iron alloy, %;
A—weight of a nickel-iron alloy, g;
$Fe\%_{mineral}$—total iron content in a mineral containing iron, niobium and titanium, %;
B—weight of a mineral containing iron, niobium and titanium (raw material), g;
$Fe\%_{Ni}$—total iron content in a nickel-containing substance (raw material), %;
C—weight of a nickel-containing substance (raw material), g.

Niobium yield ($\eta_{Nb}$): it is calculated by the following formula:

$$\eta_{Nb} = \frac{A_1 \times Nb\%_{slag}}{B \times Nb\%_{mineral} + C \times N\%_{Ni}} \times 100\%$$

where $Nb\%_{slag}$—content of niobium in a niobium-titanium rich slag, %;
$A_1$—weight of a niobium-titanium rich slag, g;
$Nb\%_{mineral}$—content of niobium in a mineral containing iron, niobium and titanium, %;
B—weight of a mineral containing iron, niobium and titanium (raw material), g;
$Nb\%_{Ni}$—content of niobium in a nickel-containing substance (raw material), %;
C—weight of a nickel-containing substance (raw material), g.

Titanium yield ($\eta_{Ti}$): it is calculated by the following formula:

$$\eta_{Ti} = \frac{A_1 \times Ti\%_{slag}}{B \times Ti\%_{mineral} + C \times Ti\%_{Ni}} \times 100\%$$

where Ti %$_{slag}$—content of titanium in a niobium-titanium rich slag, %;

A$_t$—weight of a niobium-titanium rich slag, g;

Ti %$_{mineral}$—content of titanium in a mineral containing iron, niobium and titanium, %;

B—weight of a mineral containing iron, niobium and titanium (raw material), g;

Ti %$_{Ni}$—content of titanium in a nickel-containing substance (raw material), %;

C—weight of a nickel-containing substance (raw material), g.

Enrichment ratio of niobium (F$_{Nb}$): it is calculated by the following formula:

$$F_{Nb} = \frac{Nb\%_{slag}}{Nb\%_{mineral}} \times 100\%$$

where F$_{Nb}$—enrichment ratio of niobium;

Nb %$_{slag}$—content of niobium in a niobium-titanium rich slag, %;

Nb %$_{mineral}$—content of niobium in a mineral containing iron, niobium and titanium, %.

Enrichment ratio of titanium (F$_{Ti}$): it is calculated by the following formula:

$$F_{Ti} = \frac{Ti\%_{slag}}{Ti\%_{mineral}} \times 100\%$$

where F$_{Ti}$—enrichment ratio of titanium;

Ti %$_{slag}$—content of titanium in a niobium-titanium rich slag, %;

Ti %$_{mineral}$—content of titanium in a mineral containing iron, niobium and titanium, %.

EXAMPLES 1-3

Main composition of a mineral containing iron, niobium and titanium is shown in Table 1. Semi-coke has 11.8 wt % of ash, 15.72 wt % of volatile matter, and 71.32 wt % of fixed carbon. The semi-coke has a particle size of 0.3-3 mm (including 0.3 mm and 3 mm).

The mineral containing iron, niobium and titanium, nickel oxide and the semi-coke were put into a reaction device 1 as shown in FIG. 1. The reaction device 1 is a reaction tank, wherein raw materials in the upper layer 2 and raw materials in the lower layer 4 are semi-coke, raw materials in the middle layer 3 are a mixture of the mineral containing iron, niobium and titanium and the nickel oxide. The reaction device 1 was put into a resistance furnace and heated for reaction.

After the reaction, the reaction products were cooled in the furnace, and then the reaction products were taken out and cleaned to obtain a nickel-iron alloy and a niobium-titanium rich slag, respectively, which were well separated.

Specific parameters are shown in Table 2. According to analysis of the nickel-iron alloy and the niobium-titanium rich slag, the data are shown in Table 2.

TABLE 1

|  | Fe$_2$O$_3$ (wt %) | FeO (wt %) | SiO$_2$ (wt %) | Nb$_2$O$_5$ (wt %) | TiO$_2$ (wt %) | P$_2$O$_5$ (wt %) |
|---|---|---|---|---|---|---|
| Example 1 | 36.3 | 2.3 | 18.32 | 1.3 | 2.2 | 0.37 |
| Example 2 | 45.24 | 1.6 | 17.32 | 2.4 | 3.1 | 0.55 |
| Example 3 | 58.3 | 1.2 | 16.32 | 3.4 | 4.3 | 0.87 |

TABLE 2

|  | Example 1 | Example 2 | Example 3 |
|---|---|---|---|
| Amount of a mineral containing iron, niobium and titanium (part by weight) | 1 | 1 | 1 |
| Amount of nickel oxide (part by weight) | 0.2 | 0.4 | 0.6 |
| Amount of semi-coke (part by weight) | 0.4 | 0.5 | 0.7 |
| Reaction temperature (° C.) | 940 | 980 | 1020 |
| Reaction time (h) | 35 | 32 | 26 |
| Removal rate of phosphorus (wt %) | 93.5 | 95.3 | 93.7 |
| Removal rate of iron (wt %) | 95.2 | 96.0 | 97.4 |
| Niobium yield (wt %) | 99.4 | 99.5 | 99.5 |
| Titanium yield (wt %) | 99.3 | 99.2 | 99.7 |
| Enrichment ratio of niobium (times) | 1.58 | 1.82 | 2.3 |
| Enrichment ratio of titanium (times) | 1.59 | 1.87 | 2.34 |

Note: The amount of the mineral containing iron, niobium and titanium is calculated by the iron element in the mineral containing iron, niobium and titanium, and the amount of nickel oxide is calculated by the nickel element in nickel oxide.

COMPARATIVE EXAMPLE 1

All is the same as Example 1, except the reaction temperature was 750° C.

After the reaction, the reaction products were cooled in the furnace, and then the products were taken out and cleaned. However, no nickel-iron alloy and niobium-titanium rich slag were obtained. Slag iron could not be separated.

COMPARATIVE EXAMPLE 2

All is the same as Example 1, except the amount of nickel oxide (calculated by nickel element) was 0.08 wt % and the reaction temperature was 950° C.

After the reaction, the reaction products were cooled in the furnace, and then the products were taken out and cleaned. Although a small amount of nickel-iron alloy was obtained, niobium and titanium can hardly be enriched.

The present disclosure is not limited to the above embodiments. Without departing from the essential content of the disclosure, any deformation, improvement and replacement that can be thought of by those skilled in the art fall into the scope of the present disclosure.

What is claimed is:

1. A method for enriching niobium and titanium in a mineral containing iron, niobium, and titanium, comprising:
    reacting raw materials comprising 1 part by weight of the mineral containing iron, niobium, and titanium, 0.1-0.8 part by weight of a nickel-containing substance, and 0.2-1 part by weight of carbon at 800-1500° C. to obtain a nickel-iron alloy and a niobium-titanium rich slag, where an amount of the mineral containing iron, niobium, and titanium is counted in terms of iron element, and an amount of the nickel-containing substance is counted in terms of nickel element;

wherein the nickel-containing substance is one or more selected from the group consisting of oxides of nickel and nickel minerals.

2. The method according to claim 1, wherein the reacting is performed for 20-50 h.

3. The method according to claim 1,
wherein the raw materials consist of 1 part by weight of the mineral containing iron, niobium, and titanium, 0.2-0.6 part by weight of the nickel-containing substance, and 0.4-0.7 part by weight of the carbon; and
wherein the amount of the mineral containing iron, niobium, and titanium is counted in terms of iron element, and the amount of the nickel-containing substance is counted in terms of nickel element.

4. The method according to claim 1, wherein the mineral containing iron, niobium, and titanium comprises 5-70 wt % of $Fe_2O_3$, 0.8-4 wt % of FeO, 0.1-1.5 wt % of $P_2O_5$, 0.5-20 wt % of $Nb_2O_5$, and 0.5-20 wt % of $TiO_2$.

5. The method according to claim 1, wherein the carbon is semi-coke.

6. The method according to claim 1, wherein the carbon contains 6-15 wt % of ash, 10-22 wt % of volatile matter, and 60-85 wt % of fixed carbon; and the carbon has a particle size of less than or equal to 20 mm.

7. The method according to claim 1, wherein the nickel-containing substance comprises nickel oxide.

8. The method according to claim 1, wherein
the reacting is carried out in a reaction device;
the reaction device contains the raw materials;
the raw materials in the reaction device are divided into an upper layer raw material, a middle layer raw material, and a lower layer raw material; the upper layer and lower layer raw materials are carbon, and the middle layer raw material comprises a mixture of the mineral containing iron, niobium, and titanium and the nickel-containing substance.

9. The method according to claim 1, wherein niobium has a yield of more than 99 wt %, titanium has a yield of more than or equal to 99 wt %, an enrichment ratio of niobium is more than 1.5, and an enrichment ratio of titanium is more than 1.5.

10. A method of using a nickel-containing substance to enrich niobium and titanium from a mineral containing iron, niobium, and titanium, comprising:
reacting raw materials comprising 1 part by weight of the mineral containing iron, niobium, and titanium, 0.1-0.8 part by weight of the nickel-containing substance, and 0.2-1 part by weight of carbon at 800-1500° C. to obtain a nickel-iron alloy and a niobium-titanium rich slag, where an amount of the mineral containing iron, niobium, and titanium is counted in terms of iron element, and an amount of the nickel-containing substance is counted in terms of nickel element;
wherein the nickel-containing substance is one or more selected from the group consisting of oxides of nickel and nickel minerals.

* * * * *